United States Patent [19]
Okada et al.

[11] Patent Number: 5,530,739
[45] Date of Patent: Jun. 25, 1996

[54] MAIL CENTER MANAGEMENT SYSTEM

[75] Inventors: Akihiro Okada; Tooru Kino, both of Kawasaki, Japan

[73] Assignee: Fujitsu Limited, Kanagawa, Japan

[21] Appl. No.: 854,826

[22] Filed: Mar. 18, 1992

[30] Foreign Application Priority Data

Mar. 20, 1991 [JP] Japan ................... 3-057384

[51] Int. Cl.⁶ ................................... H04M 1/64
[52] U.S. Cl. ................... 379/89; 379/67; 379/207; 379/212; 379/219; 379/100; 358/402
[58] Field of Search ................. 379/67, 88, 89, 379/100, 93, 94, 207, 211, 212, 219; 358/402

[56] References Cited

U.S. PATENT DOCUMENTS

| | | | |
|---|---|---|---|
| 4,790,003 | 12/1988 | Kepley et al. | 379/96 |
| 4,933,967 | 6/1990 | Lo et al. | 379/89 |
| 5,263,082 | 11/1993 | Kotake et al. | 379/93 |
| 5,274,696 | 12/1993 | Perelman | 379/207 |
| 5,278,897 | 1/1994 | Mowery et al. | 379/67 |
| 5,325,310 | 6/1994 | Johnson et al. | 358/402 |
| 5,402,472 | 3/1995 | McLampy et al. | 379/67 |

FOREIGN PATENT DOCUMENTS

| | | |
|---|---|---|
| 0237834 | 9/1987 | European Pat. Off. . |
| 0295904 | 12/1988 | European Pat. Off. . |
| 0309993 | 4/1989 | European Pat. Off. . |
| 0412799 | 2/1991 | European Pat. Off. . |
| 44139 | 2/1991 | Japan . |

*Primary Examiner*—Jeffery A. Hofsass
*Assistant Examiner*—Fan Tsang

[57] ABSTRACT

A mail center management system includes a first network accommodating a plurality of subscriber terminals via lines, and a plurality of mail devices connected to the first network. Each of the mail devices, which has a device number and subscriber information about all the subscriber terminals, includes a storage medium for storing mails received from the subscriber terminals. A second network connects the mail devices to each other and transfers the mails between the mail devices. Each of the mail devices includes a first part for determining whether a request to transfer from a first one of the subscriber terminals to a second one of the subscriber terminals includes a subscriber number of the second one of the subscriber terminals or the device number of one of the mail devices together with the subscriber number. Further, each of the mail devices includes a second part for storing, via the second network, the mail in the storage medium of one of the mail devices to which the first and second ones of the subscriber terminals are connected when the first means determines that the request includes no device number and for storing, via the first and second networks, the mail in the storage medium of one of the mail devices to which the second one of the mail devices is connected when the first means determines that the request includes the device number together with the subscriber number.

15 Claims, 9 Drawing Sheets

| SUBSCRIBER NO. | PASSWORD | ALLOWED |
|---|---|---|
| 00001 | 0001 | OK |
| ~ | ~ | ~ |
| 22220 | 0100 | NG |
| 33300 | 0200 | OK |

B:

| OWN/OTHER | DEVICE NO. | SUPPORT TEL NO. | REPEAT MEANS | REPEATER NO. |
|---|---|---|---|---|
| OWN | 001 | 03,044 | — | — |
| OTHER | 010 | 06 | DEDICATED LINE | 190000001 |
| ~ | ~ | ~ | ~ | ~ |
| OTHER | 011 | 03 044 | LAN | 100000002 |

C:

| SUBSCRIBER NO. | INFORMED TERMINAL NO | RECEIVE TERMINAL NO | MAIL BOX CAPACITY |
|---|---|---|---|
| 00001 | 3220 | 3221 | 10 MB |
| ~ | ~ | ~ | ~ |
| 22220 | 3330 | 3330 | 20 MB |
| 33300 | 3450 | 3550 | 0 MB |

MAIL CENTER MANAGEMENT SYSTEM

BACKGROUND OF THE INVENTION

(1) Field of the Invention

The present invention generally relates to a mail center management system.

(2) Description of the Prior Art

Recently, a new network has been proposed in which a mail center, which provides various mail services by means of various media, such as speech, facsimile and images, is provided in the network. For example, such a main center is provided in a local area network. Generally, the mail center is designed, taking into account a future increasing demand of mail services. Hence, it is desired that the main center can be easily expanded without greatly changing the system configuration.

In the past, two communication devices, such as facsimile machines, transferred information between them. However, recently, there has been a demand to send identical information to a plurality of destination devices. For example, it is required to simultaneously send identical information to a plurality of persons and customers via a network. For this requirement, a mail center as described above is connected to the network. Generally, a single main center is connected to the network. As the number of users increases and/or the number of mails increases, line circuits connected to the network are increased. In addition to an increase in the number of line circuits, or instead thereof, a storage device, such as a disk device, is added to working storage devices. In some cases, some working storage devices may be replaced with new ones.

If some working storage devices are replaced with new ones, information stored therein must be transferred to the new storage devices. During this data transfer process (a few days to a few weeks), the mail services are not available. Further, there is a possibility that some information may be lost or damaged during the data transfer process.

SUMMARY OF THE INVENTION

It is an object of the present invention to provide a mail center management system in which the above disadvantages are eliminated.

A more specific object of the present invention is to provide a mail center management system in which the system can be easily expanded without stopping the system and causing inconvenience to users.

The above objects of the present invention are achieved by a mail center management system having the following structure. That is, the mail center management system includes a first network accommodating a plurality of subscriber terminals via lines, and a plurality of mail devices connected to the first network. Each of the mail devices, which has a device number and subscriber information about all the subscriber terminals, includes a storage medium for storing mails received from the subscriber terminals. A second network connects the mail devices to each other and transfers the mails between the mail devices. Each of the mail devices includes a first part for determining whether a request to transfer from a first one of the subscriber terminals to a second one of the subscriber terminals includes a subscriber number of the second one of the subscriber terminals or the device number of one of the mail devices together with the subscriber number. Further, each of the mail devices includes a second part for storing, via the second network, the mail in the storage medium of one of the mail devices to which the first and second ones of the subscriber terminals are connected when the first means determines that the request includes no device number and for storing, via the first and second networks, the mail in the storage medium of one of the mail devices to which the second one of the mail devices is connected when the first means determines that the request includes the device number together with the subscriber number.

BRIEF DESCRIPTION OF THE DRAWINGS

The objects, features and advantages of the present invention will become more apparent from the following detailed description when read in conjunction with the accompanying drawings, in which:

FIG. 7 diagrammatically shows decision tables used in each mail device;

DESCRIPTION OF THE PREFERRED EMBODIMENTS

Figure 1:
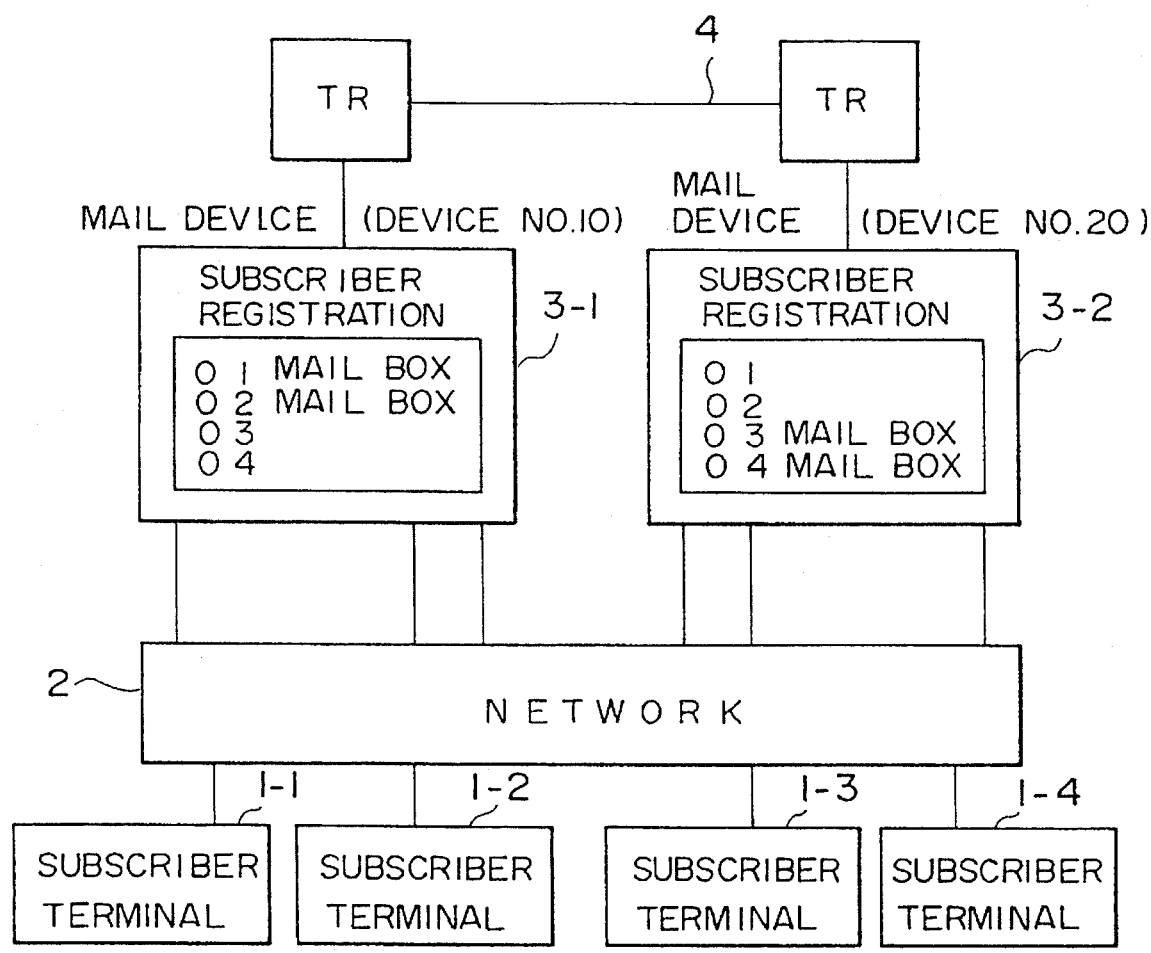
FIG. 1 is a diagram showing an outline of the present invention.

FIG. 1 shows an outline of the main center management system of the present invention. The system shown in FIG. 1 comprises subscriber terminals 1-1–1-4, a network 2, such as a private branch exchange or a local area network, mail devices 3-1 and 3-2 installed in a mail center, and a communication network 4 connecting the mail devices 3-1 and 3-2.

According to the present invention, a plurality of mail devices, each having a predetermined capability, are provided, as shown in FIG. 1. Some additional mail devices can be connected to the system. Identification numbers necessary to respectively specify the mail devices have hierarchical numbering system. The subscriber terminals 1-1–1-4 may be grouped on the basis of which mail center each of the subscriber terminals is connected to. In the case shown in FIG. 1 the subscriber terminals 1-1 and 1-2 belong to the group having the mail device 3-1, and the subscriber terminals 1-3 and 1-4 belong to the group having the mail device 3-2. Each of the mail centers 3-1 and 3-2 has registered information about subscriber terminals connected to the other group. If a failure has occurred in one of the mail devices 3-1 and 3-2, which has not worked, the subscriber terminals which belong to the group relating to the defective mail device can continuously receive the mail services via the mail device other than the defective mail device.

As has been described previously, the present invention employs the hierarchical numbering system. More specifically, each hierarchical number includes a mail device number and a subscriber number. In the case shown in FIG. 1, device numbers "10" and "20" are assigned to the mail devices 3-1 and 3-2, respectively. Subscriber numbers "01"–"04" are assigned to the subscriber terminals 1-1–1-4, respectively. As has been described previously, the subscribers 1-1 and 1-2 belong to the group having device number "10" (3-1), and the subscribers 1-3 and 1-4 belong to the group having device number "20" (3-2).

Each of the mail devices 3-1 and 3-2 stores the registered subscriber numbers "01"–"04" of all the subscriber devices in the system. As shown in FIG. 1, each of the mail devices 3-1 and 3-2 includes information showing that a mail box is provided in its own storage device. The above information is added to each subscriber number. In the example shown in FIG. 1, the mail boxes of the subscribers 1-1 and 1-2 are formed in the mail device 3-1, and the mail boxes of the subscribers 1-3 and 1-4 are formed in the mail device 3-2.

A request to deliver a mail from a subscriber terminal in one group to a subscriber terminal in the other group comprises information composed of the subscriber number of the destination terminal and the device number having the corresponding mail box. If the terminal device 1-1 has a request to send a mail to the terminal device 1-3, the request comprises information "2003". If a mail is requested to send from a subscriber terminal to a subscriber terminal in the same group, only the subscriber number is sent. For example, if the terminal device 1-1 has a request to send a mail to the terminal device 1-2, the request comprises information "02". Each of the mail devices 3-1 and 3-2 directly delivers the mail to the destination terminal connected thereto, if only the subscriber number is specified. If not only the subscriber number but also the device number is specified, the mail is transferred via the communication network 4.

A log-on condition (showing whether to receive services using the mail devices) is managed in each of the mail devices 3-1 and 3-2. Each of the mail devices 3-1 and 3-2 checks the subscriber number or the combination of the subscriber number and the device number.

If an additional mail device is added to the system shown in FIG. 1, a device number ("30", for example) is assigned to the additional mail device. Line circuits for connecting the additional mail device to the networks 2 and 4 are provided. All the subscriber numbers in the system are registered in the additional mail device. Further, some mail boxes are formed in the additional mail device. During the procedure for connecting the additional mail device to the system, the existing mail devices 3-1 and 3-2 are continuously working.

If one of the mail devices has stopped to operate due to a fault, the subscriber terminals belonging to the same group as the defective mail device can access the other mail devices and receive mail services. Mails addressed to the subscriber terminals belonging to the same group as the defective mail device can be delivered via the normal mail devices by the normal procedure for specifying the destination terminal. Further, by employing the hierarchical numbering system and executing the log-on process with respect to a specific one of the mail devices by using only the subscriber number, it becomes possible to separately use lines specifically used for transferring calls which should be terminated at the mail devices and lines specifically used for transferring messages from the mail devices to the subscriber terminals. Furthermore, it becomes possible to arbitrarily determine ratio of both the differently used lines.

Figure 2:
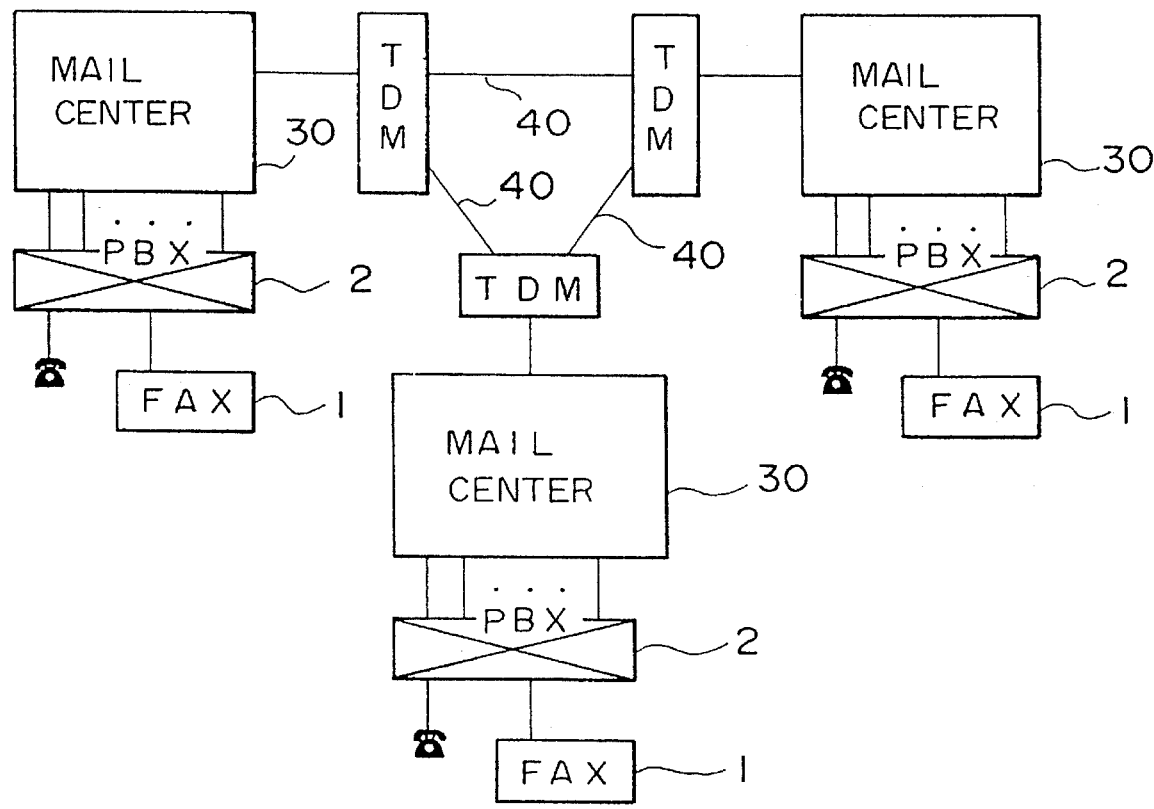
FIG. 2 is a block diagram of a first system structure in which dedicated lines are provided between mail centers.

FIG. 2 is a block diagram of a first system structure in which three mail centers 30 are coupled to each other via dedicated high-bit rate digital lines 40. The three mail centers 30 are connected to respective PBXs 2 (which correspond to the network 2 shown in FIG. 1) via lines. Each of the PBXs 2 accommodate a plurality of subscriber terminals, such as telephone sets and facsimile machines (FAX) 1. The three mail centers 30 are connected to respective time-division multiplexing (TDM) devices. The TDM devices are connected to each other via the high-speed digital dedicated lines 40. Mail information and control data are transferred via the digital lines 40.

Figure 3:
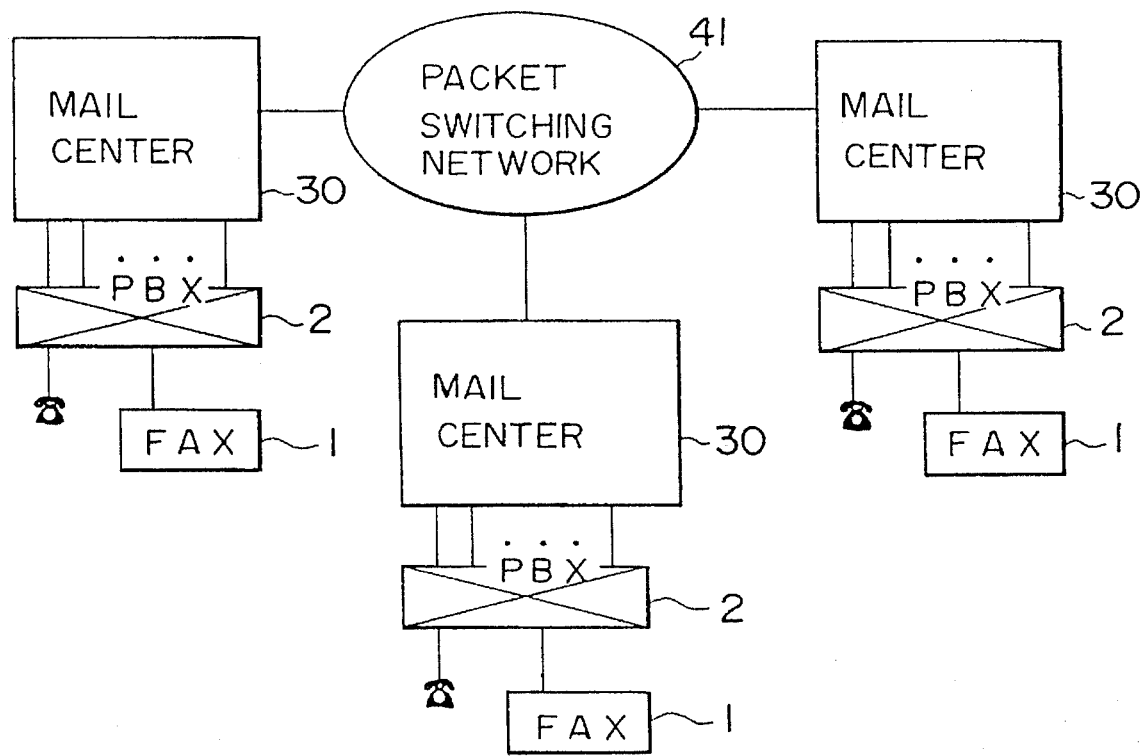
FIG. 3 is a block diagram of a second system structure in which a packet network is provided between mail centers.

FIG. 3 is a block diagram of a second system structure in which the digital lines 40 and the TDM devices are replaced by a packet switching network 41. The other structural parts of the system shown in FIG. 3 are the same as those shown in FIG. 2.

Figure 4:
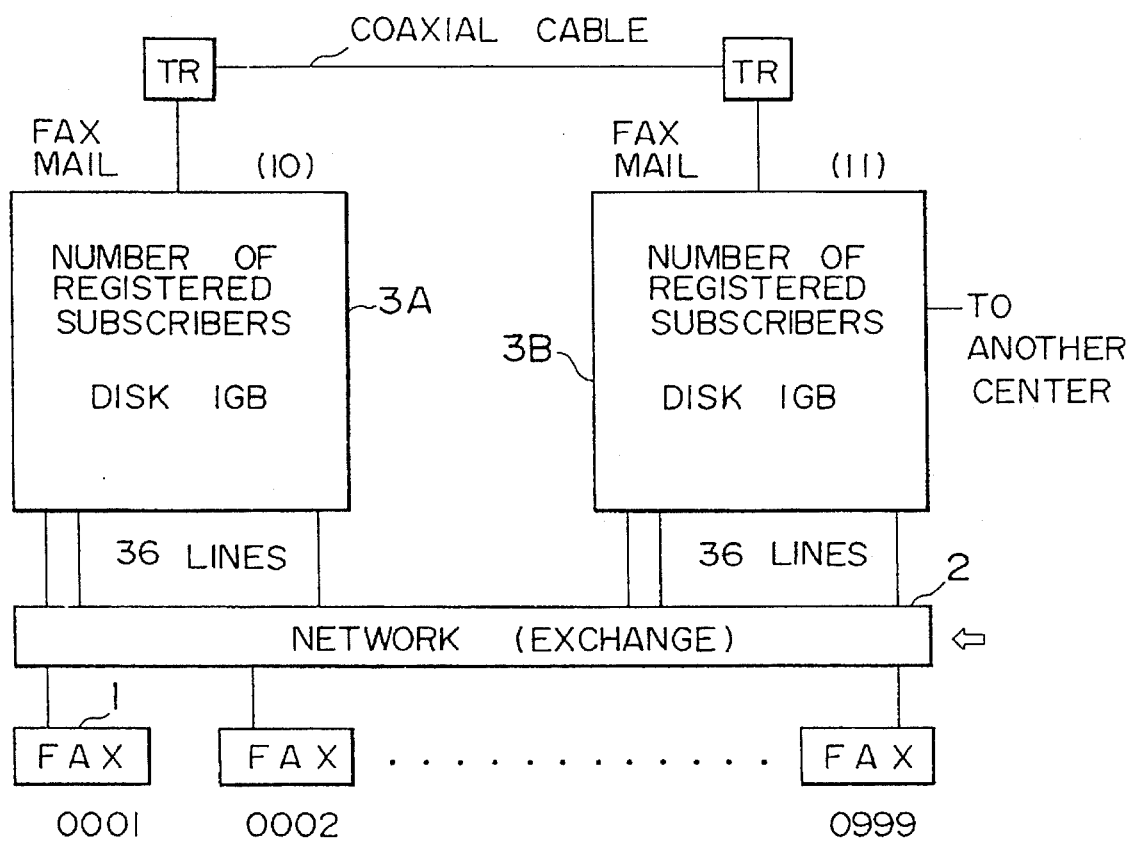
FIG. 4 is a block diagram of the structure of each mail center.

FIG. 4 shows an example of each mail center used in the present invention. The mail centers shown in FIG. 4 are large-scale FAX mail centers used in a LAN. It will now be assumed that initially, only a FAX mail center 3A which is capable of accommodating 1000 subscriber terminals and which has a mail storage device having a capacity of 1 GB (giga bytes) is provided and 36 lines connected to the network 2 are connected. If there is a demand to accommodate an increased number of subscribers (less than or equal to 1000), an additional mail storage capacity and an increased number of subscribers are needed to accommodate the increased number of subscribers.

In this case, an additional FAX mail device 3B capable of 1000 subscriber terminals is prepared and assigned device number "11". Information about the 1000 subscriber terminals registered in the FAX mail device 3A is also registered in the FAX mail device 3B. Further, a mail storage device having a storage capacity of 1 GB is connected to the FAX mail device 3B. The total mail storage capacity of the system becomes equal to 2 GB. The FAX mail devices 3A and 3B are connected to each other via a 10 Mbps-LAN, which conforms to, for example, the 8802/3-CSMD of the ISO. Each of the mail devices 3A and 3B may be connected to another mail center via a dedicated line or a packet network (see FIGS. 2 and 3).

The number of lines increases to twice (72 lines) the initial number of lines (equal to 36) by providing 36 lines connected to the FAX mail device 3B. The subscribers are grouped as follows:

Subscriber numbers 0001–0499: mail boxes thereof are formed in the mail device 3A and registered as a device 10 group.

Subscriber numbers 0500–0999: mail boxes thereof are formed in the mail device 3B and registered as a device 11 group.

When a subscriber terminal calls another subscriber terminal in the same group in the expanded system shown in FIG. 4, the calling subscriber terminal sends the called subscriber number without the group number to the network. When a subscriber terminal calls another subscriber terminal in a different group, the calling subscriber terminal sends the called subscriber number and the number of the different group via a transmitter and a coaxial cable.

When a fault has occurred, only the subscriber number is sent without the group number. If both a list in which the group numbers are assigned to the mail devices and a list in which the group numbers are not assigned to the mail devices are registered in the state where a fault has occurred, the latter list is used. It is possible to designate the destination subscriber terminal by marking a specific position on a mark sheet and optically reading the mark by means of an optical mark reader. In this case, a different type of mark sheet in which no group numbers are assigned is used. All the subscriber terminals are informed of these changes, and changed so that the changes become effective.

It will now be assumed that the ratio of transmission lines to reception lines is equal to 18:18 in the configuration shown in FIG. 4. The transmission lines are lines which carry calls from the mail devices, and the reception lines are lines which carry calls terminating at the mail devices.

When the original system is expanded by adding the mail device 3B (36 lines), as shown in FIG. 4, if 18 lines out of the 36 lines connected to the mail device 3A are used as reception lines, and the remaining lines (54 lines) are used as transmission lines, it is possible for the subscribers in the group of the mail device 3A to access the mail device 3B. In this case, the address of the destination terminal is specified by adding the group number to the destination subscriber number. In this case, the ratio of the transmission lines to the reception lines=18:54=1:3.

Figure 5:
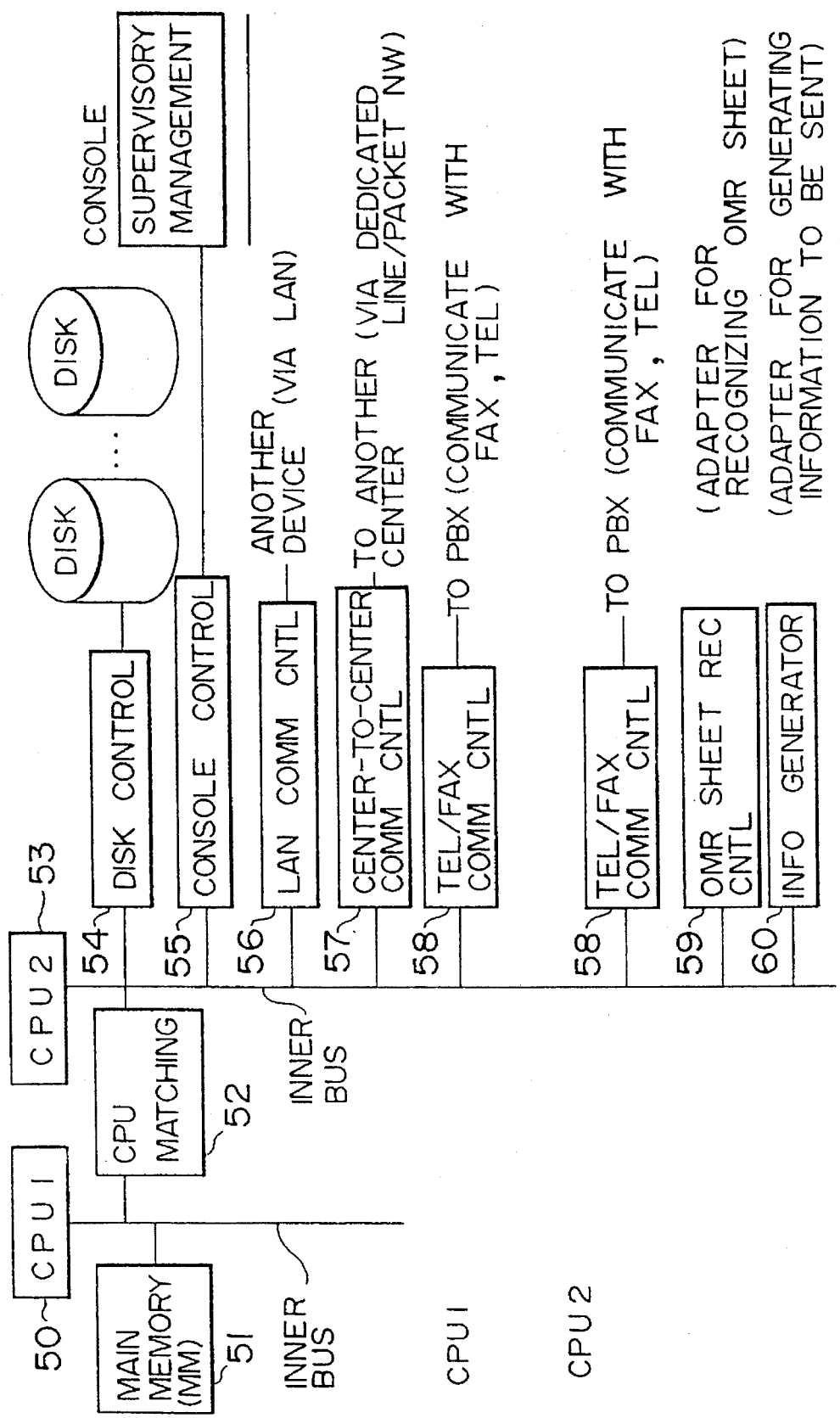
FIG. 5 is a block diagram of a hardware structure of each mail device.

FIG. 5 is a block diagram of a hardware structure of each of the mail devices 3A and 3B. The mail device comprises a CPU1 50 for processing programs, a main memory (MM) 51, a CPU2 53 for use in input/output processing, and a matching unit 52 which operatively connects the CPU1 and CPU2 to each other. The CPU2 controls the following structural elements. A disk controller 54 controls disks in which mail boxes are formed and FAX data are stored. A console controller 55 controls a console for use in supervisory and management procedures. A LAN communication unit 56 communicates with another mail device via a LAN. A center-to-center communication unit 57 communicates with another center via a dedicated line or a packet switching network. A plurality of TEL/FAX communication units 58 communicate with PBXs via lines. An OMR recognition unit 59 recognizes various OMR sheets. An information generator 60 generates a variety of information which is to be transmitted to other devices.

Figure 6:
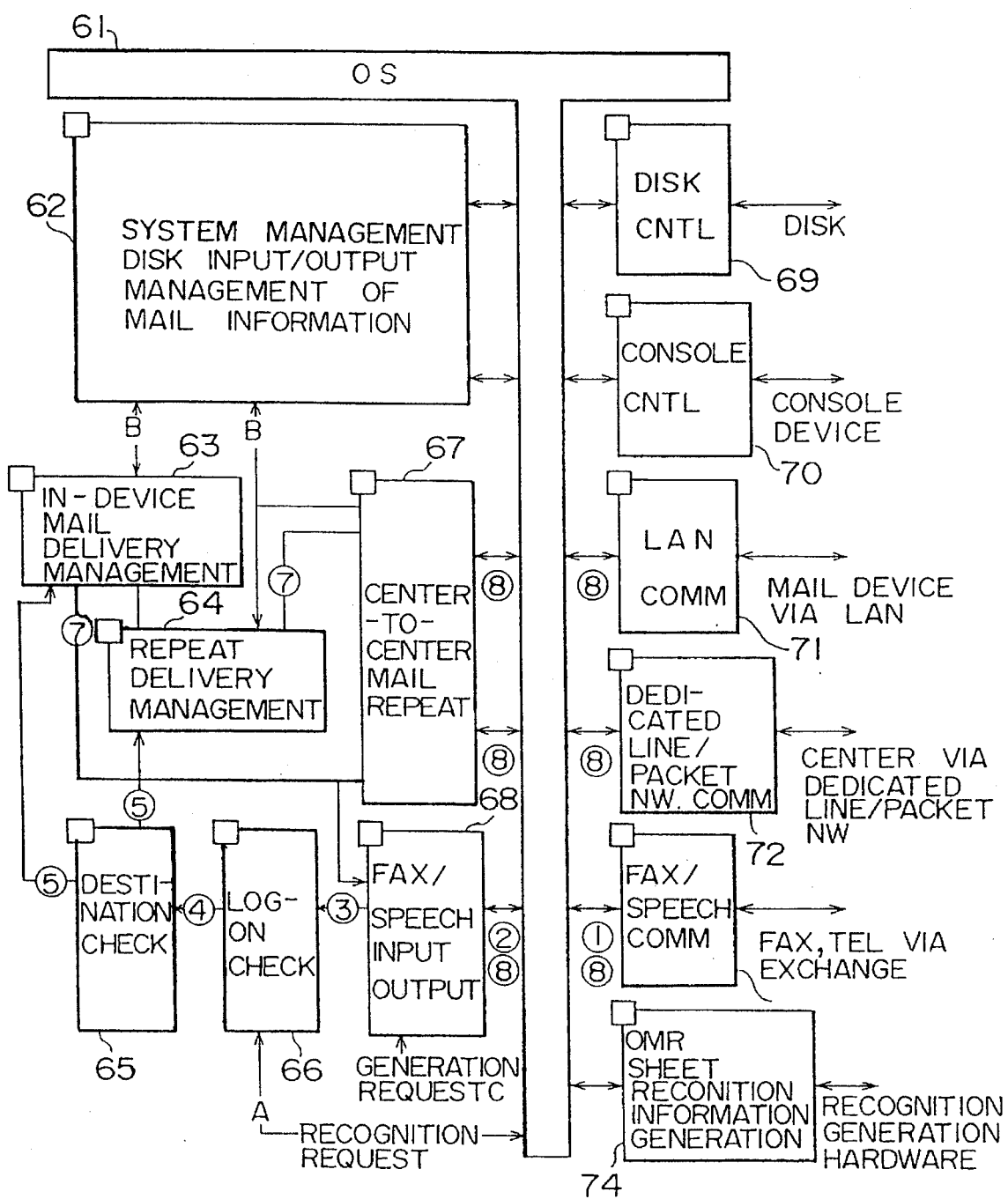
FIG. 6 is a diagram showing programs installed in each mail device.

FIG. 6 shows a program architecture used in the mail device. Each program shown in FIG. 6 is controlled by an operating system (OS) 61. A disk input/output management program 62, which handles system management/main information, controls an inner mail delivery management program 63 for controlling mail delivery in the mail device, and a repeated mail delivery management program 64 for controlling mail delivery via another mail center. A center-to-center mail repeating program 67 controls a procedure for transferring a mail to another mail center. A FAX/speech input/output program 68 controls inputting and outputting speech and data to FAXs and telephone sets. A log-on check program 66 checks a subscriber number and a password number which are input via each subscriber terminal. A mail destination check program 65 checks which mail device and which subscriber a requested mail should be transferred.

A disk control program 69, a console control program 70, a LAN communication program 71, a dedicated line/packet network communication program 72, a FAX/speech communication program 73 and an OMR sheet recognition information generation program 74 are programs which control the disk controller 54, the control controller 55, the LAN communication unit 56, the center-to-center communication unit 57, the TEL/FAX communication units 58, the OMR sheet recognition unit 59 and the information generator 60, respectively. Numerals sandwiched between [ ] in FIG. 6 shows a process sequence which is executed after a connection with the subscriber terminal (FAX or telephone set) is established. Capital letters A, B and C shown in FIG. 6 denote processes which are executed upon request.

FIG. 7 shows various decision tables. FIG. 7-A shows a log-on decision table, which is referred to when each subscriber is allowed to receive the mail delivery services of the mail devices. The subscriber number and password which are input from the subscriber is compared with the contents of the log-on decision table shown in FIG. 7-A. When it is determined that the subscriber is allowed to receive the mail delivery services, the mail services are presented to this subscriber. FIG. 7-B shows a decision table used for determining which one of its own device, another center and another mail device direction the requested the mail should be sent to by referring to the input destination address. When the destination address is specified by the telephone number, it is compared with support telephone numbers registered in the decision table shown in FIG. 7-A. Then, the mail is sent to the supported mail device or mail center. FIG. 7-C shows an in-device subscriber management table, which is used for determining the terminal informed of the results of the requested communication when the destination is specified by the subscriber telephone number and the real telephone number of the destination terminal to which the mail is delivered. Further, data about the storage capacity of the mail box assigned to each subscriber is defined in the table shown in FIG. 7-C.

Figure 8:
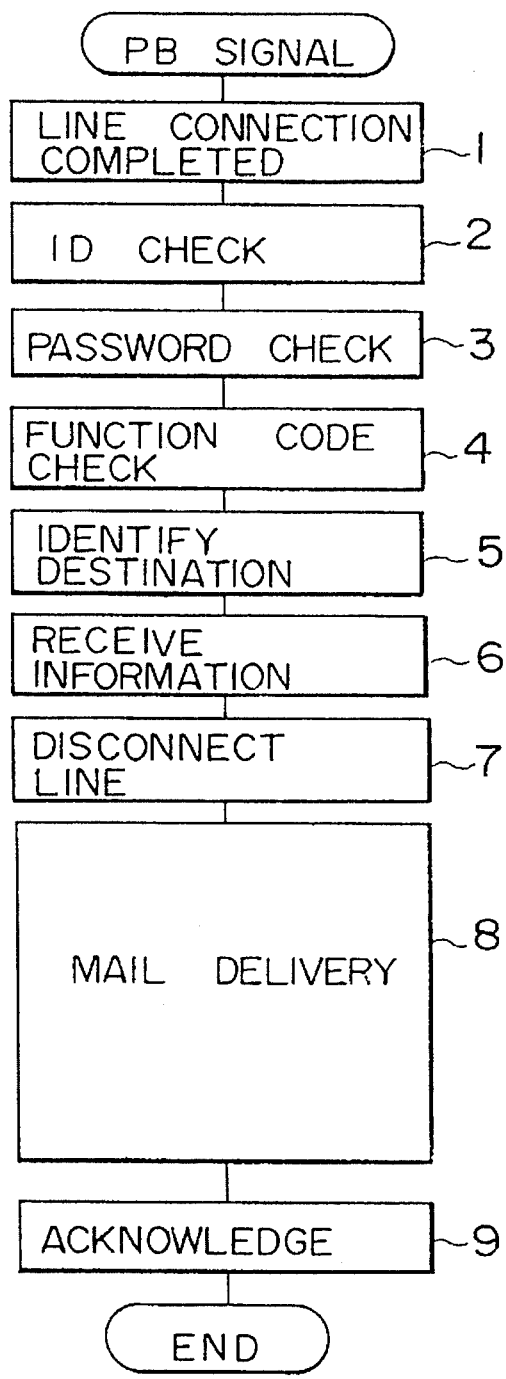
FIG. 8 is a flowchart of a basic process executed in each mail device when PB signal is used.

FIG. 8 is a flowchart of the operation of the above system when the mail delivery service is requested by a PB (Push Button) signal. After the line connection is established at step 1, the subscriber number (ID), the password and a function code are sequentially checked at steps 2, 3 and 4, respectively. At step 5, the destination terminal is identified. At step 6, information (data about the delivery request, FAX data and so on) from the calling subscriber is received. When step 6 has been completed, the established line is disconnected at step 6. The received information is sent to the delivery management programs 63 and 64 shown in FIG. 6 on the basis of the identified destination. Then, it is determined, at step 8, to which one of the subscriber terminals connected to its own device, the subscriber terminal via the LAN and another center the mail should be delivered. At step 9, the calling subscriber terminal is informed of acknowledgement of the mail delivery request.

Figure 9:
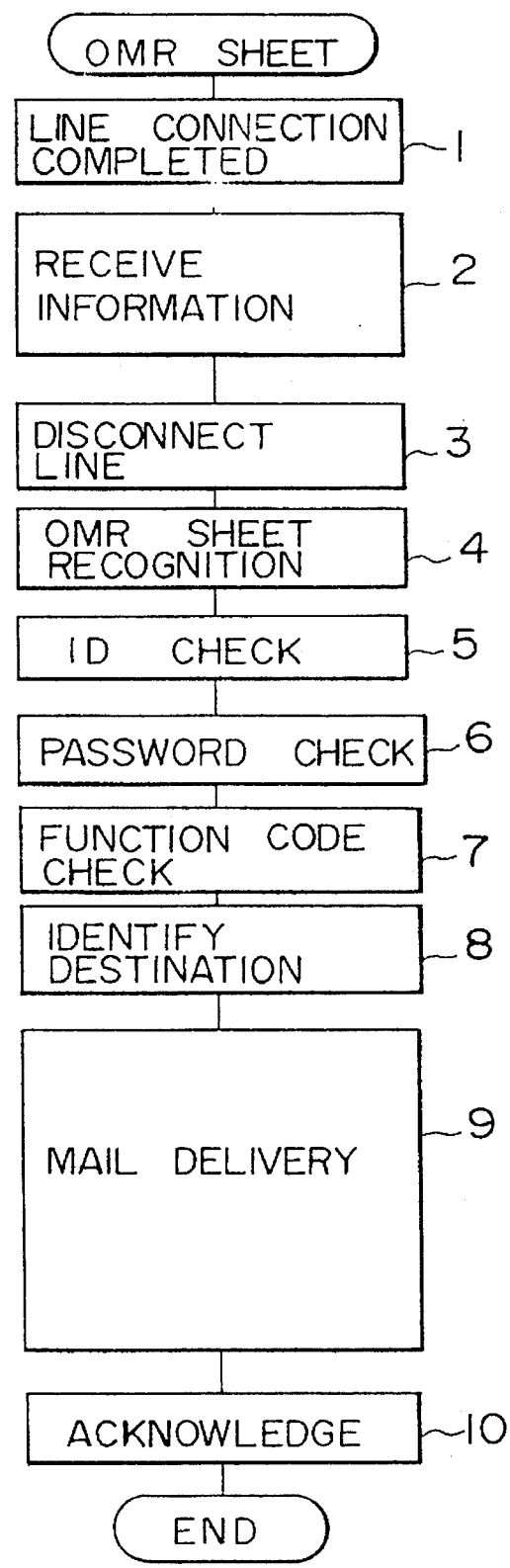
FIG. 9 is a flowchart of a basic process executed in each mail device when an OMR sheet is used.
Figure 10:
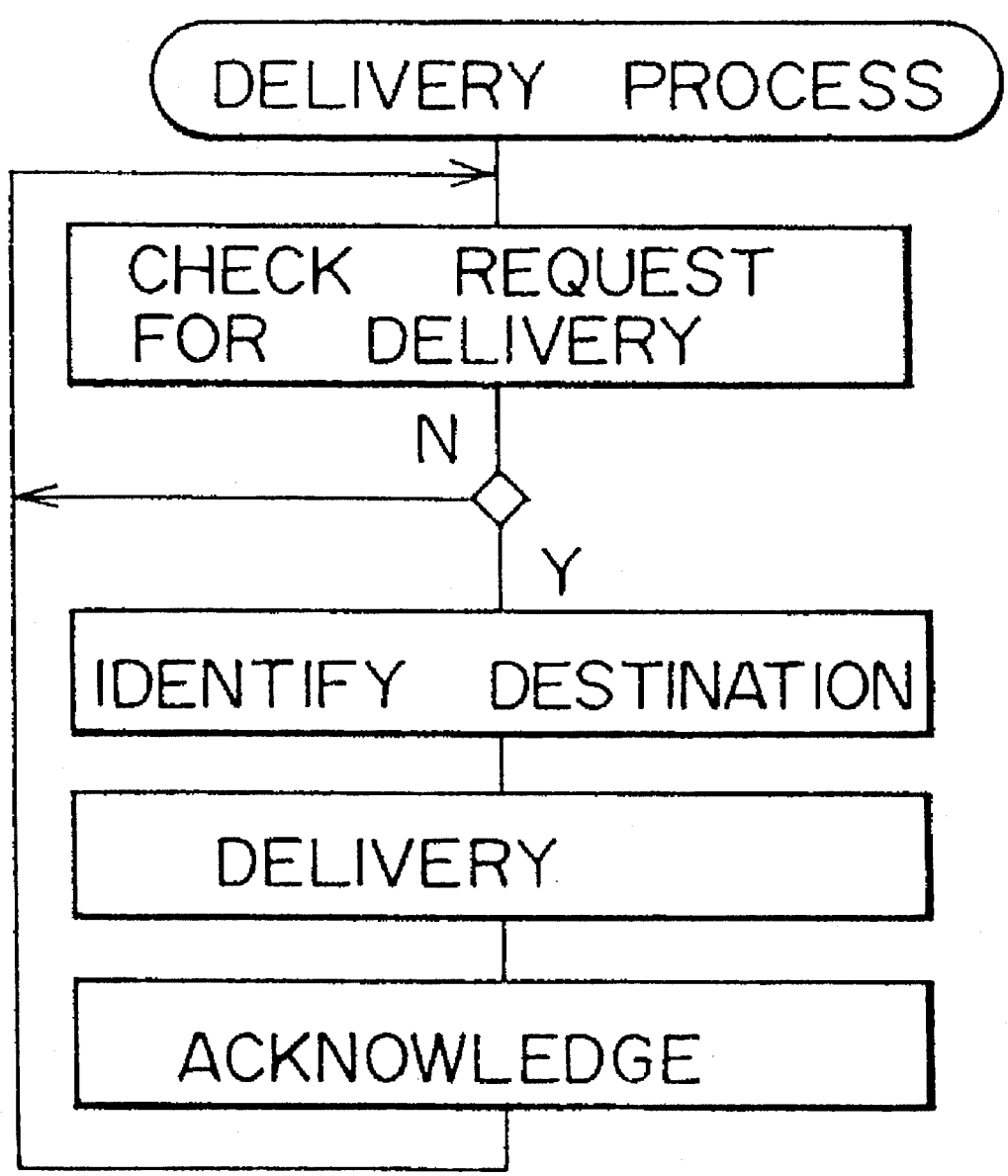
FIG. 10 is a flowchart of another basic process executed in each mail device.

FIG. 9 is a flowchart of the operation of the aforementioned system when the mail delivery service is requested by means of the OMR sheet. The calling subscriber marks a predetermined area on the OMR sheet in order to input facsimile information indicative of the destination terminal. Then, a line is established at step 1 shown in FIG. 9, and thereafter the input facsimile information is received at step 2. Then, the line is disconnected at step 3. The OMR sheet is recognized from the received facsimile information at step 4, and steps 5–8 are successively executed in the same manner as the steps 2–5 shown in FIG. 8. Then, steps 9 and 10 are executed in the same manner as the steps 8 and 9 shown in FIG. 8.

FIG. 9 shows a basic mail delivery process of the mail device. It is determined, at step 1, whether or not there is a request to deliver a mail. When the result of this determination is affirmative, the destination subscriber is identified at step 2, and the mail is delivered thereto at step 3. The calling subscriber is informed of the result of delivery at step 4.

According to the present invention, it becomes possible to execute the system expansion procedure by using the working facilities without stopping the operation of the system. Further, when a fault has occurred in a mail device, another mail device can immediately provide the mail services to the subscriber terminals connected to the defective mail device. Furthermore, an increase in the number of lines and the storage capacity can be easily obtained. In conventional technology, such an increase cannot be realized by a single mail device. Moreover, it is possible to arbitrarily change the ratio of transmission lines to reception lines. This structure will be very effective in a case where it is requested to simultaneously send facsimile information to a large number of subscriber terminals during a short period. The ratio of transmission lines to reception lines is limited to a range between 1:1 and 1:35 when a single mail device is used. According to the aforementioned embodiment of the present invention, it is possible to obtain such a ratio between 1:1 and 36×N where N is the number of mail devices specifically used for transmission.

It is also possible to increase the size of the mail box in a subscriber unit. If the total mail storage capacity provided by a single mail device is shared by 1000 subscribers, each subscriber is equally assigned a storage capacity of 1/1000. According to the present invention, each subscriber can be assigned a storage capacity of N/1000 where N is the number of mail devices, and hence a large amount of information can be stored. If a storage capacity in each of the mail devices equally assigned for each subscriber terminal is denoted by C, each subscriber has a storage capacity of C×N.

The present invention is not limited to the specifically disclosed embodiments, and variations and modifications may be made without departing from the scope of the present invention.

What is claimed is:

1. A mail center management system comprising:

a first network accommodating a plurality of subscriber terminals via lines;

a plurality of mail devices connected to said first network, each of said mail devices having a device number and subscriber information about all the subscriber terminals, each of said mail devices comprising a storage medium for storing mails received from the subscriber terminals; and a second network connecting said mail devices to each other and transferring said mails between said mail devices, wherein each of the mail devices comprises:

first means for determining whether a mail delivering request from a first one of the subscriber terminals to a second one of the subscriber terminals includes a subscriber number of said second one of the subscriber terminals or the device number of one of the mail devices together with said subscriber number; and second means for storing, via said first network, a mail in the storage medium when said first means determines that said request includes no device number, said second means also storing, via said first network, a mail in the storage medium and further delivering the mail to the mail device of said device number through the second network when said first means determines that said request includes the device number together with the subscriber number.

2. A mail center management system as claimed in claim 1, wherein:

said lines connecting said first network to said subscriber terminals are grouped into transmission lines and reception lines; and a ratio of the transmission lines to the reception lines is between 1:1 and 1: M×N where M is the number of lines connected to one of the mail devices and N is the number of the mail devices.

3. A mail center management system as claimed in claim 1, wherein said mail devices each comprises means for requesting, when a fault has occurred in one of the mail devices, the subscriber terminals to send a request including the subscriber number without the device number to the mail devices other than said one of the mail devices.

4. A mail center management system as claimed in claim 1, wherein:

said subscriber terminals are grouped into a plurality of groups, each of the groups being respectively related to a corresponding one of the mail devices; and the storage medium of each of the subscriber terminals is provided in one of the mail devices which belongs to a corresponding one of the groups.

5. A mail center management system as claimed in claim 1, wherein each of said subscriber terminals has a mail storage having a constant storage capacity, so that each of the subscriber terminals has a mail storage capacity equal to C×N where C is said constant storage capacity and N is the number of the mail devices.

6. A mail center management system as claimed in claim 1, wherein the first network comprises a private branch exchange.

7. A mail center management system as claimed in claim 1, wherein the second network is connected to said mail devices via dedicated lines.

8. A mail center management system as claimed in claim 1, wherein said subscriber information comprises data indicating whether or not each of the subscriber terminals is to allow to receive a mail delivery service.

9. A mail center management system as claimed in claim 1, wherein said subscriber terminals comprise telephone sets.

10. A mail center management system as claimed in claim 1, wherein said subscriber terminals comprise facsimile machines.

11. A mail center management system comprising:

a plurality of mail centers; and a first network connecting said mail centers to each other, wherein each of the mail centers comprises:

communication means for communicating with other mail centers;

a second network accommodating a plurality of subscriber terminals via lines;

a plurality of mail devices in respective of said mail centers connected to said second network, each of said mail devices having a device number and subscriber information about all the subscriber terminals, each of said mail devices comprising a storage medium for storing mails received from the subscriber terminals; and means for connecting said mail devices to each other for transferring said mails between said mail devices, wherein each of the mail devices comprises:

first means for determining whether a mail delivering request from a first one of the subscriber terminals to a second one of the subscriber terminals includes a subscriber number of said second one of the subscriber terminals or the device number of one of the mail devices together with said subscriber number; and second means for storing, via the second network, a mail in the storage medium when said first means determines that said request includes no device number, said second means also storing, via said second network, a mail in the storage medium and further delivering the mail to the mail device of said device number through the first network when said first means determines that said request includes the device number together with the subscriber number.

12. A mail center management system as claimed in claim 11, wherein said first network comprises:

time division multiplexing devices respectively connected to the mail devices; and high-bit rate digital lines connecting said time division multiplexing devices to each other.

13. A mail center management system as claimed in claim 11, wherein said first network comprises a packet switching network.

14. A mail center management system as claimed in claim 11, wherein:

said lines connecting said second network to said subscriber terminals are grouped into transmission lines and reception lines; and a ratio of the transmission lines to the reception lines is between 1:1 and 1: M×N where M is the number of lines connected to one of the mail devices and N is the number of the mail devices.

15. A mail center management system as claimed in claim 11, wherein said mail devices comprises means for requesting, when a fault has occurred in one of the mail devices, the subscriber terminals to send a request including the subscriber number without the device number to the mail devices other than said one of the mail devices.

* * * * *